Dec. 30, 1969     L. P. FAY     3,486,761
HYDRAULIC ELEVATING CONTROLS
Filed Aug. 30, 1967     2 Sheets-Sheet 1
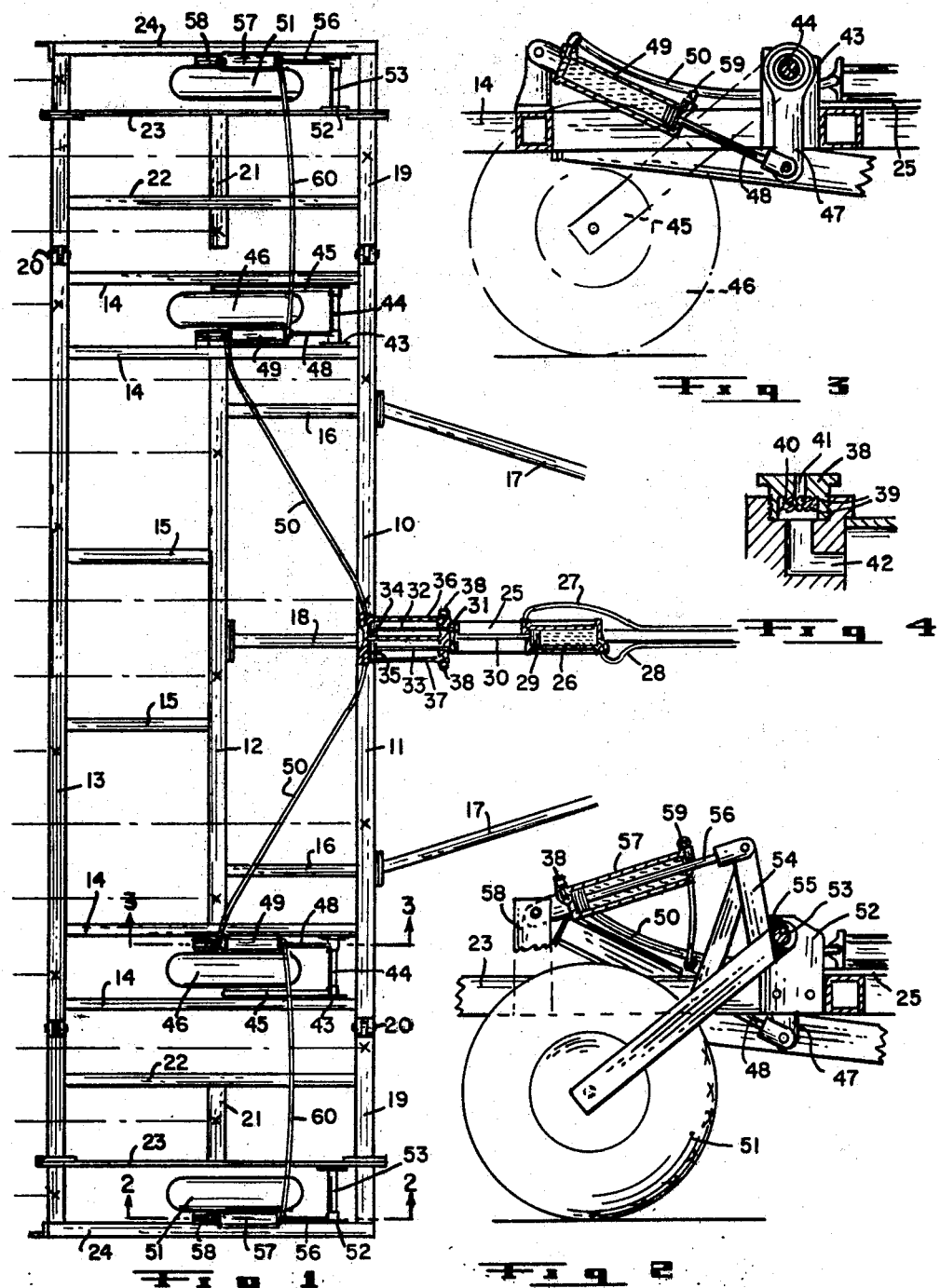
INVENTOR
Lawrence P. Fay
by
Agent Dec. 30, 1969   L. P. FAY   3,486,761
HYDRAULIC ELEVATING CONTROLS
Filed Aug. 30, 1967   2 Sheets-Sheet 2
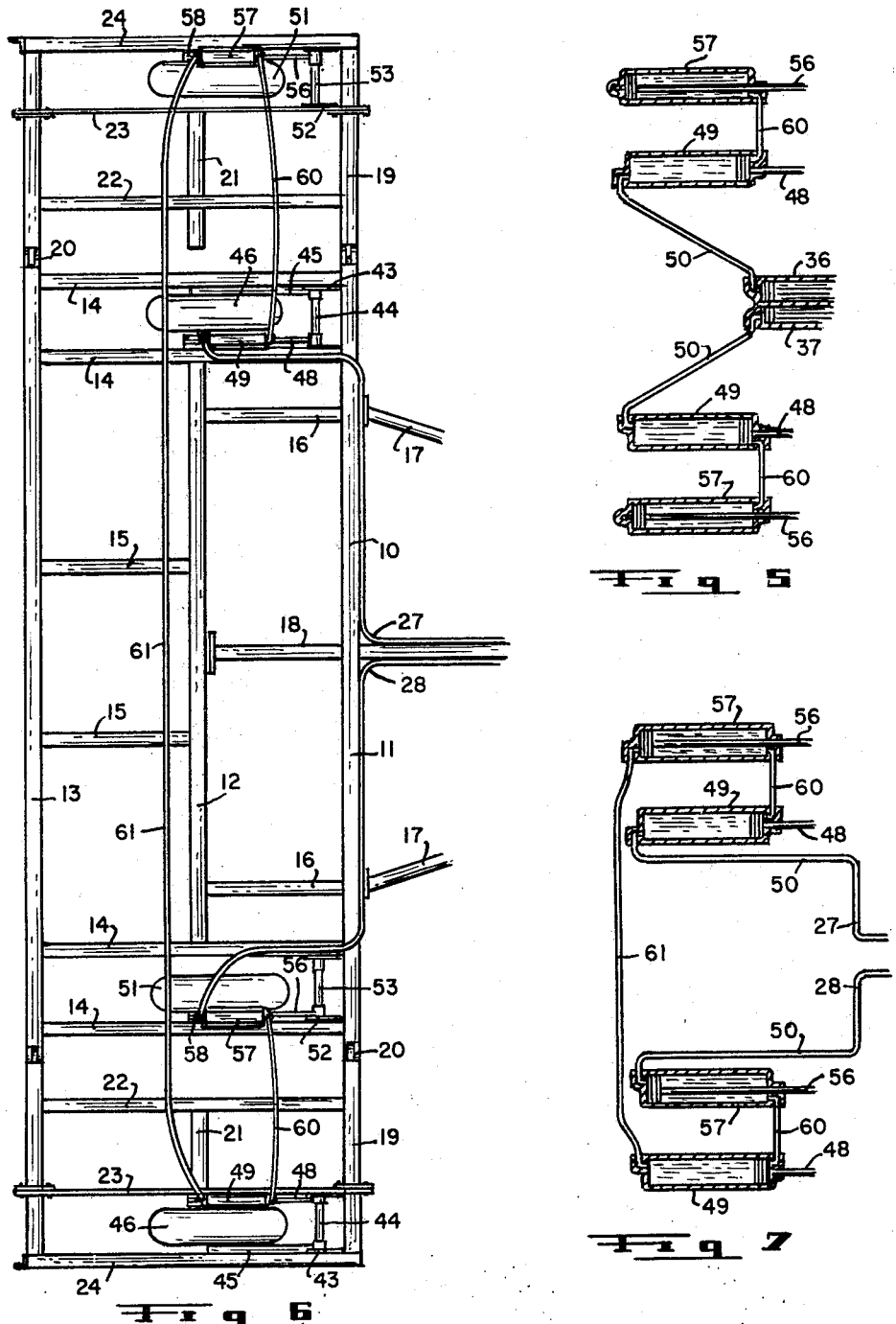

United States Patent Office 3,486,761
Patented Dec. 30, 1969

3,486,761
HYDRAULIC ELEVATING CONTROLS
Lawrence P. Fay, Regina, Saskatchewan, Canada, assignor to Roll-O-Flex Ltd., Regina, Saskatchewan, Canada
Filed Aug. 30, 1967, Ser. No. 664,455
Int. Cl. B60g 1/00
U.S. Cl. 280—43.23       3 Claims

ABSTRACT OF THE DISCLOSURE

Hydraulic elevating control for an implement wherein a frame is supported on each side by a wheel, and said frame has side extension wings hinged thereto which are each supported by a further single wheel; each of said wheels are provided with a separate hydraulic slave cylinder for raising and lowering the frame and wings on said wheels; and a ram-operated pair of control cylinders each hose-connected in series with the slave cylinders on one side of the frame for even delivery of pressured fluid thereto, and synchronized elevation of the implement sides; and a modification of the above, wherein the fluid power for the ram is directly connected in series with all the slave cylinders for said elevating purpose, and the ram and the control cylinders are eliminated.

---

This invention relates to frame raising and lowering of farm implements on their respective support wheels, and is an improvement over my former patent application for "Hydraulic Height Controls," No. 594,847, filed Nov. 16, 1966.

In said former application, a master ram is power-operated from the hauling tractor to rock or pivot a lengthwise shaft on the implement frame, and cranks on each end of this shaft operate control cylinders to raise and lower the main frame on said support wheels while the exhaust from said control cylinders will operate further slave cylinders on wing extensions of the implement to simultaneously raise and lower said extensions with the main frame.

The principal object of the present invention is: to eliminate the lengthwise shaft on the implement for an all-fluid operation of the cylinders.

A further object of the invention is: to provide means for simultaneous dual operation of the cylinders at each side of the implement by a pair of master cylinders which are controlled by a master ram.

A further object of the invention is: to provide means for directly operating all the frame-lifting cylinders by the power supply from the hauling tractor.

A still further object of the invention is: to present a simple, inexpensive and durable construction for the above purposes.

With the above important and other minor objects in view, which will become more apparent as the disclosure proceeds, the invention consists essentially in the construction and arrangement of the various parts hereinafter more particularly described, reference being had to the accompanying drawings wherein:

FIGURE 1 is a plan view of an implement frame and showing a master ram controlling a dual system of frame-lifting cylinders.

FIGURE 2 is an enlarged vertical cross section taken on the dot and dash line 2—2 of FIGURE 1.

FIGURE 3 is an enlarged vertical cross section taken on the dot and dash lines 3—3 of FIGURE 1.

FIGURE 4 is an enlarged vertical section at the air end of a cylinder and showing a breather fitting therefor.

FIGURE 5 is a diagrammatic showing of the cylinder operation for FIGURE 1.

FIGURE 6 is a plan view similar to FIGURE 1 but showing a modified method for operating the frame-lifting cylinders by direct fluid power from a hauling tractor.

FIGURE 7 is a diagrammatic showing of the cylinder operation for FIGURE 6.

In the drawings like characters of reference indicate corresponding parts in the several figures.

The main frame of the machine is shown at 10 in FIGURE 1. This frame comprises front, intermediate and rear longitudinal beams 11, 12 and 13 respectively, preferably of square tubular cross section. The beam ends are closed by spaced pairs of tubular cross bars 14, the intermediate beam 12 connects the inner cross bars 14, while the rear part of the frame receives a pair of short brace bars 15 and the front part short brace bars 16. A pair of central converging beams 17 project from the front longitudinal beam 11, opposite the bars 16, and a central lower beam 18 slopes from the intermediate beam 12 and under the beam 11 to provide a forward draft connection (not shown) with the beams 17.

A pair of wing extension 19 are pivotally mounted at 20 on each end of the main frame 10, and are adapted to be normally in aligned relation therewith. These wings each comprise a U-shaped outer frame having an H-shaped interior build-up 21 centrally connected thereacross. One side 22 of the H is a rectangular tubing while the other side 23 is a bar. The outer bar of the U-shaped frame is designated 24. The above is a general description of a complete framework for farm machinery. The $x$'s along the longitudinal beams 11, 12 and 13 represent the tool positions such as cultivator shank plows (not shown), and the dot and dash lines at the back indicate the plow cutting lines on the ground, which will be noted are evenly spaced apart. The present invention is mounted on this framework and will now be described.

A small elongated platform 25 is directly mounted above the lower beam 18, being rear fastened to the beam 11 and projecting ahead. A main ram cylinder 26 is mounted on this platform, and the ends thereof have outlets which are connected with flexible pipes or hoses 27 and 28 for passage ahead along the beam 18 to a source of oil pressure on the hauling tractor (not shown). A piston 29 is slidably mounted in the ram and a shaft 30 therefrom extends out the rear to pivotally connect at 31 between and to the forward ends of shafts 32 and 33 of pistons 34 and 35 which are slidably mounted in a pair of joint control cylinders 36 and 37, carried by the platform 25. The front ends of these latter cylinders are each provided with a breather fitting 38 (best shown in FIGURE 4).

The breather fittings consist of open-ended casings threaded into the cylinder ends for communication therewith and they are each provided with a pair of screens 39 which are spaced apart by suitable filter material 40. A passage 41 is provided through the breather and connects through the screens with a passage 42 to the interior of the control cylinder. When the main ram 26 is operated from the tractor, the pistons 34 and 35 in the control cylinders are also jointly operated, air passing in or out the breather fittings 38, depending on which way the pistons are moving.

At each end of the main frame 10, a pair of upstanding brackets 43 project from the front ends of the cross bars 14 to provide bearings for a pair of stub shafts 44 therebetween (see FIGURE 3). A pair of sloping arms 45 each have their upper ends welded to one of the stub shafts, while their lower ends are bearing-supported, each by a ground wheel 46. Each stub shaft also carries a downwardly projecting lever 47 which pivotally connects with a piston rod 48 of a slave cylinder 49, the other end of which is pivotally mounted on one of the cross bars 14, opposite the lengthwise beam 12. The upper ends of these slave cylinders are each connected, through a hose 50, with the rear of one of the control cylinders 36–37. Accordingly, when the main ram 26 is operated, oil will flow through these hoses by pressure from the control cylinder pistons to operate the slave cylinders 49, and raise or lower the main frame 10 on the ground wheels 46.

The two wing extensions 19 are each supported in the same manner by ground wheels 51, both of which are aligned with those 46. A pair of upstanding brackets 52 (similar to those 43) project from the front ends of the cross bars 23 and 24 to support stub shafts 53 therebetween. A pair of bell cranks 54, formed from three welded bars (see FIGURE 2) have the corner of each welded at 55 to one of the latter stub shafts. The lower long arms of each bell crank are each bearing-carried by one of the ground wheels 51, while their upper short arms each pivotally connect to a piston rod 56 of a further slave cylinder 57. The opposite ends of these latter cylinders are each pivotally mounted on a bracket 58 carried by one of the end cross bars 24 of the wing extensions. The upper front ends of the cylinders 57 and the lower front ends of the cylinders 49 are provided with elbows 59 so these cylinders, at each end of the framework, can be connected by hoses 60, while the lower ends of the cylinders 57 are provided with breather fittings 38 (the same as for the control cylinders 36–37, note FIGURE 4). Accordingly, when the main frame is raised or lowered by the slave cylinders 49, oil also flows along the hoses 60 to operate the slave cylinders 57 and simultaneously raise or lower the wing extensions therewith.

From the above it will be seen that the dual control cylinders 36–37 adequately substitute for the cranks and longitudinal shaft in my former application mentioned, each cylinder fluidly operating a set of the paired slave cylinders at each end of the framework, while the breather fittings permit free air escape or entrance at the ends of the lines, instead of air locks.

It will be appreciated of course that the dual control cylinders 36–37, operated by the master ram 26, are necessary to insure that an equal supply of oil passes to each pair of right and left slave cylinders so each framework end will evenly raise or lower. It might be noted that one of the tractor hoses to the ram, say 27, could be directly connected to the hoses 50 by a T fitting for a parallel operation of these slave cylinders, the other hose 28 being connected to the cylinder outlets having the breather fittings 38, which would be removed. However, in such an arrangement, one end of the framework might raise or lower faster than the other, and the late end catch up when the fast end stopped. Obviously, this would not be satisfactory, so the series modification shown in FIGURES 6 and 7 was developed as follows:

In these latter figures, the left slave cylinders 49 and 57, including cranks, wheels and the hose 60, are the same as those shown in FIGURES 1 and 5, but the right slave cylinders 49 and 57, including cranks and wheels, have been reversed in position, although these cylinders are still forwardly connected by the hose 60. The rear ends of the re-arranged outer cylinders have been connected together by a hose 61, and the tractor hoses 27 and 28 have each been directly connected to one of the hoses 50, it being noted that the right hose 50 is now connected to the rear of the right cylinder 57. The master ram and the pair of control cylinders have been eliminated. All this is very clearly brought out in the diagram shown in FIGURE 7, when compared with FIGURE 5. Accordingly, FIGURES 6 and 7, like FIGURES 1 and 5, permit a reduced volume of oil (caused by the immersed piston rods) to flow between the pairs of end cylinders. In this new arrangement, the full oil volume of the cylinders flows back and forth between the hoses 27 and 28 from the tractor, and along the hose 61. The result is that a closed direct oil circuit is provided to the former slave cylinders for a balanced raising or lowering of the framework ends, when the tractor supply is turned on, and this also includes simplicity of construction.

What I claim as my invention is:

1. In a wheel-supported implement frame having wheel-supported side extensions hinged thereto to form a framework; an hydraulic elevation control for simultaneously raising and lowering said parts on all said support wheels, comprising: cranks pivotally mounted at each side of the frame and on each of said extensions, and each bearing-mounted on one of said support wheels; a series of hydraulic cylinders, each connected with and controlling one of said cranks; and flexible hosings interconnecting each of the cylinders of the frame cranks with one of the cylinders of the extension cranks and said cylinders with a source of fluid power, to equally operate said cranks and bodily raise and lower said framework.

2. An hydraulic elevating control for an implement as defined in claim 1, wherein the cylinders at each side of the framework are separately hose connected in series; a pair of master cylinders are dual-operable by applied power, and each master cylinder hose-connected to one of said cylinder series for synchronized fluid-raising and lowering of the sides of said framework.

3. An hydraulic elevating control for an implement as defined in claim 1, wherein the cylinders controlling said cranks are all hose-connected in series, including said source of fluid power.

References Cited

UNITED STATES PATENTS

| | | | |
|---|---|---|---|
| 3,033,296 | 5/1962 | Kaufman et al. | 172—421 |
| 3,162,459 | 12/1964 | Marmorine et al. | 280—43.23 |
| 3,191,954 | 6/1965 | Schvetz | 280—43.23 |
| 3,271,042 | 9/1966 | Flodin | 280—43.23 |
| 3,356,382 | 12/1967 | Fay | 280—411.1 |

LEO FRIAGLIA, Primary Examiner

JOEL E. SIEGEL, Assistant Examiner